No. 883,365. PATENTED MAR. 31, 1908.
I. A. WEAVER.
WHEELED PLOW.
APPLICATION FILED DEC. 16, 1903.
2 SHEETS—SHEET 2.
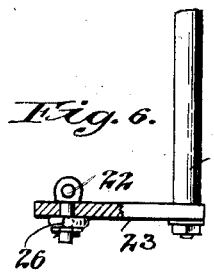
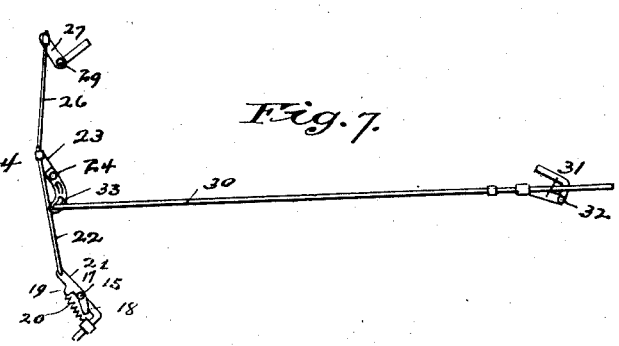
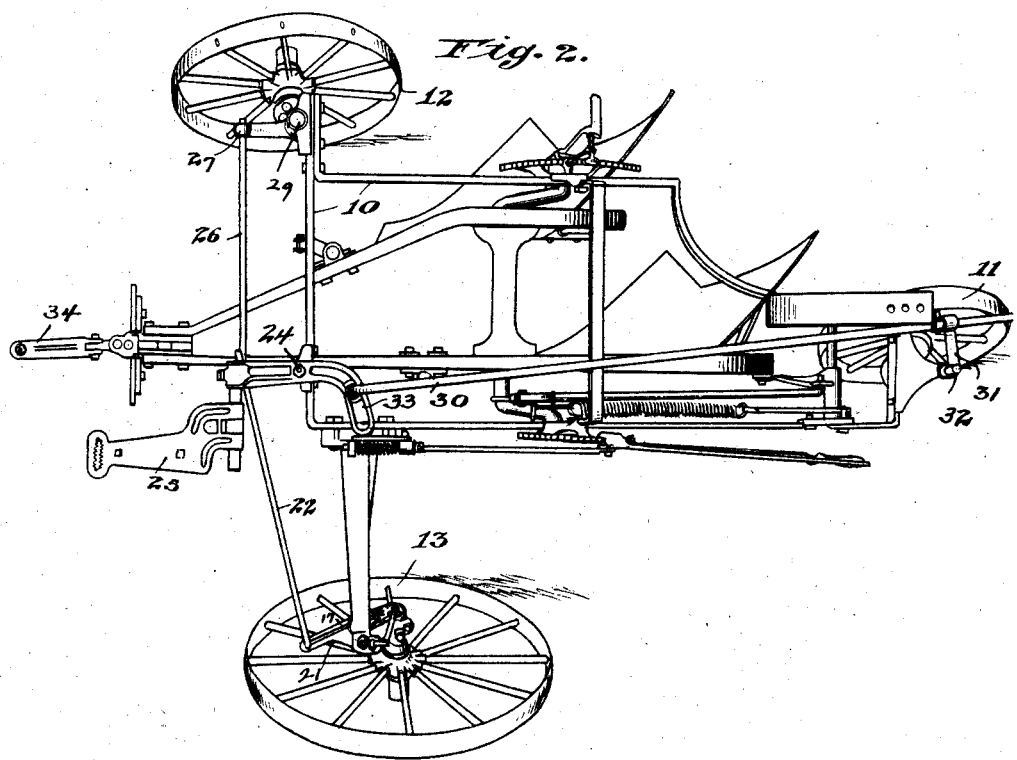
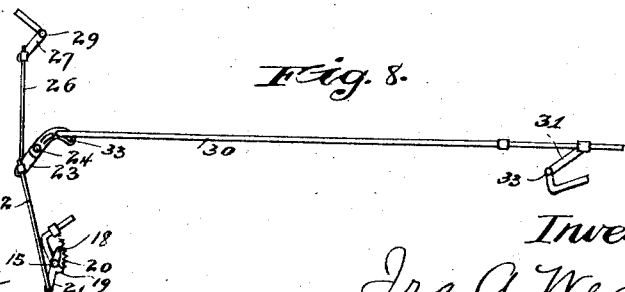
Witnesses,
Inventor,
Ira A. Weaver

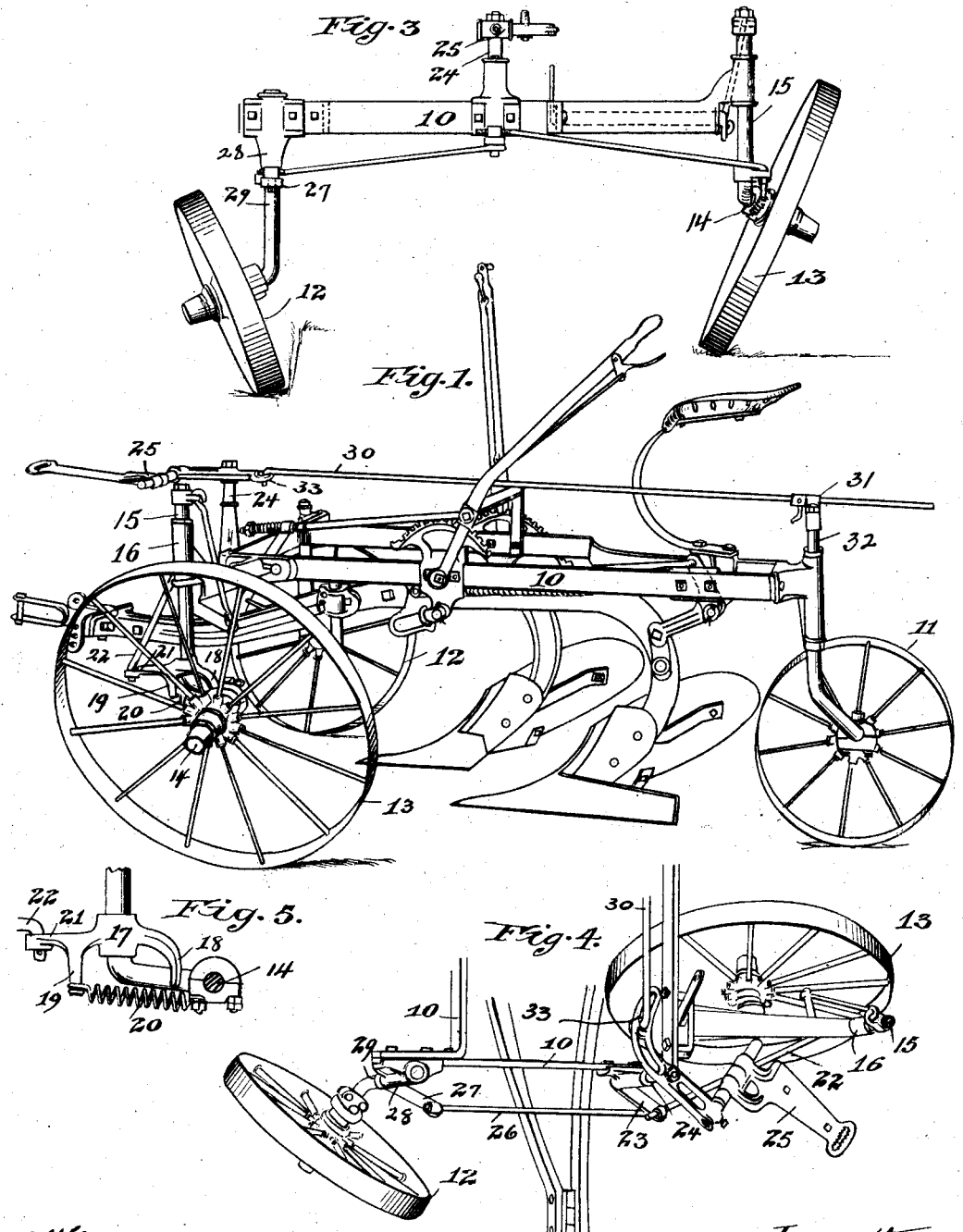

UNITED STATES PATENT OFFICE

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

WHEELED PLOW.

No. 883,365.　　　　　Specification of Letters Patent.　　　Patented March 31, 1908.

Application filed December 16, 1903. Serial No. 185,384.

*To all whom it may concern:*

Be it known that I, IRA A. WEAVER, of Springfield, Illinois, have invented certain new and useful Improvements in Wheeled Plows, of which the following is a specification.

My invention relates to certain improvements in wheeled plows of that class wherein a plow frame is provided with a front furrow wheel, a rear furrow, or caster wheel, and a land wheel. These plows require four or more draft animals which are hitched abreast, one of the animals traveling in the furrow and the others on the land and each animal requiring, say thirty inches space. Therefore, the line of draft of the team is at one side of the line of draft of the plows, which creates a tendency in the plows to run out of the land. This tendency is increased by the pressure on the landside of the plow and the outer end of the plow moldboards, and to prevent the plow running out of the land, the front furrow wheel is set so as to lead the plow into the land. As this lead would cause the rim of this wheel to dig into the landside it is set at an angle, the plane of the wheel intersecting a vertical plane passing through the axis of the wheel. This angular inclination somewhat impairs the control of the plow by the front furrow wheel, causes a strain or thrust tangent to the spokes and also causes the edge of the rim to dig into the bottom of the furrow.

The land wheel is usually placed back of the front furrow wheel and on the opposite side of the frame and assists to carry the weight of the frame which is usually vertically adjustable with the plows and with reference to the wheels. The rear furrow wheel or caster wheel serves to guide the plow and assists in turning. With the three wheels thus placed and the line of draft of the team non-coincident with the line of draft of the plows, the draft traces are at an angle to the line of forward movement and the draft is considerably increased. With the described arrangement the land wheel has little, if any, effect in guiding the plow, this duty being imposed almost wholly upon the front furrow wheel. There is also a tendency to throw too much of the weight of the frame on the furrow wheel as the land wheel has usually been so placed that it forms a fulcrum over which the frame tilts and the resistance to the plows tends to tilt the frame, thus throwing its weight on the front furrow wheel and the draft traces. To overcome these defects, I place the land wheel well forward, preferably at a point about opposite the front furrow wheel. This land wheel is also placed at an angle to a vertical plane passing through its axis and is also given a lead so as to counteract the tendency of the plow to run out of the land. This wheel so placed takes its proper share of the weight of the frame and correspondingly relieves the furrow wheel, and the forward tilting of the frame is overcome. The land wheel in this position serves the further purpose of relieving the thrust on the front furrow wheel spokes and assists to guide the plow. To facilitate the latter function, said wheel is mounted so as to swivel or turn around its axis and therefore serves as a caster wheel in turning the plow.

To give plenty of room for four or more draft animals, I place the pole connection on the landside of the draft connection instead of upon or near the front furrow wheel standard; and in order to place the front furrow wheel and the land wheel under control of the team, I connect said wheels to a part moving with the pole connection. This connection between the wheels I preferably make adjustable and in such manner that the land wheel may turn or swivel independently thereof in some positions, thereby permitting its caster effect. This connection is preferably made by employing rods, one for each wheel, the outer ends of the rods being pivotally connected to short arms projecting from the boxes or bearings of the respective wheels and their inner ends having threaded connection with an arm projecting from and turning with a standard which carries the pole casting. This arm is made longer than the arms carried by the wheel boxes or standards so that the turning movement of the plow is accelerated.

The rear or caster wheel proper is also preferably connected by a steering rod with the pole piece in the usual manner so as to prevent side thrust on the pole while permitting the proper swing of the caster wheel in turning the plow.

In the drawings Figure 1 is an elevation in slight perspective, taken from the land side of the plow; Fig. 2 is a plan view; Fig. 3 is a front elevation of the frame, front wheels and pole connections; Fig. 4 is a plan view showing the position of the movable parts as in turning; Fig. 5 is a detail showing the manner of mounting and controlling the land wheel; Fig. 6 is a detail view of the lower end of the pole standard and the connections for the furrow wheel and land wheel therewith; Figs. 7 and 8 are diagrammatic views showing two positions of the steering rods and their connected parts.

In the accompanying drawings, 10 represents the plow frame which is supported upon the caster wheel, 11, the furrow wheel, 12, and the land wheel, 13. The caster and furrow wheels are placed in the usual positions, but the land wheel 13 is located well forward and nearly opposite the front furrow wheel. This wheel is mounted on a short axle 14, formed on the lower end of the standard 15, carried in the sleeve 16, the latter forming a part of the casting bolted to the front corner of the frame. On the lower end of the standard is mounted a three armed lever 17, one of the arms 18 being adapted to contact the horizontal portion of the standard, the arm 19 being connected to the box or bearing by the spring 20, and the arm 21 affording a pivotal connection for a rod 22 which extends inwardly to and has a threaded connection with an arm 23 on the lower end of the standard 24, which is mounted on the frame and carries the pole casting 25. A rod 26 has its inner end connected adjustably with the outer end of the arm 23 and to an arm 27, carried by the sleeve bearing 28 of the furrow wheel standard 29. 30 represents a steering rod which is extended rearwardly and connected by an arm 31 with the standard 32 of the caster wheel, the front end of the rod 30 having a slotted connection with an arm 33 carried by the pole standard. It will be observed that the arm 23 is longer than the arms 21 and 27. It will also be observed that the pole casting 25 is placed on the land side of the draft connection which is represented by the clevis 34.

It will be observed particularly by reference to Fig. 3 that the front furrow wheel is set at an angle and is also given a lead toward the land, and that the land wheel is also set at an angle and has a lead in the same direction. By means of the connecting rods 22 and 26, these wheels are placed under the control of the team through the pole connection, which serves to hold the wheels in their set position, the tendency of the plows to run out of the land being counteracted by the set of these wheels. In turning either to the right or left, as indicated in Figs. 7 and 8, the furrow wheel 12 will be turned by the pole and by reason of the fact that the arm 23 is longer than the arms 21 and 27, the turning movement of the furrow wheel is accelerated and the stop 18 is withdrawn from contact with axle 14, allowing the land wheel to caster freely. The arm 17 has an axial movement on the standard of the land wheel so that in the turning movement of the plow it is free to turn independently of its connection to the pole in either direction, as indicated in Figs. 7 and 8, while it becomes locked with the pole connection through the arm 18 in the forward movement to prevent outward turning of said wheel. The spring 20 affords an elastic link to hold the arm 18 against the axle 14 in the forward movement of the plow and while passing over rough or uneven ground, and to assist in backing the plow, as shown in Fig. 4. The connection of the steering rod 30 with its arm 33 permits the rapid acceleration of the turning movement through the caster wheel, and the rod 30 transmits the thrust of the caster wheel to the pole standard in such manner as to relieve the pole itself of the thrust. It will be observed that the location of the pole connection on the landside of the draft connection affords plenty of room for the team, but otherwise the location of the pole connection does not modify materially the function of the land wheel in the described position in controlling and guiding the plows and therefore it is obvious that these features of my invention are not necessarily inter-dependent.

I have described my invention in connection with a gang plow and it is obvious that the location of the pole on the land side of the draft connection is more important in such a plow because of the number of draft animals necessary in the operation of the gang plow. The steering connections are also more important in a plow of this character because of the increased tendency to side draft where a gang is used, but some of the features of the invention are useful in the construction of a modern sulky plow, particularly with a plow making a wide cut.

While I have described with some particularity the features of construction, it is obvious that the same might be modified without departing from the spirit and scope of the invention and I do not, therefore, limit my invention to mere structural details.

I claim:

1. In a wheeled plow, the combination of the plow frame, of a caster wheel, a front furrow wheel, and a land wheel, said wheels disposed forwardly of the plow points, and mounted to turn about vertical axes; a pole or tongue, and adjustable connections between the pole or tongue and said wheels, substantially as described.

2. In a wheeled plow, the combination of a frame, a caster wheel at the rear thereof, a furrow wheel at the forward end of the frame and a land wheel opposite the front furrow wheel, a pole or tongue, connections between the pole or tongue and said forward wheels, said wheels being mounted to turn around vertical axes and the land wheel being free to swivel or turn on its axis independently of its connection to the pole, substantially as described.

3. In a wheeled plow, the combination of a frame, a caster wheel at the rear thereof, a furrow wheel at the front thereof, a land wheel located substantially in transverse alinement with the front furrow wheel, a pole or tongue, and connections between the pole or tongue and the front wheels, the latter being mounted to swivel or turn upon vertical axes and the connection between the pole and the land wheel being elastic whereby to permit a swinging movement of said wheel around its axis and a stop to limit said independent swing during the forward movement of the plow.

4. In a wheeled plow, the combination with the plow frame, of a caster wheel, a front furrow wheel and a land wheel, of a pole or tongue connected to the frame on the land side of the line of draft, connections between the pole and the front furrow and land wheels, the latter being mounted to turn around vertical axes, and a connection between the pole and the caster wheel, substantially as set forth.

IRA A. WEAVER.

Witnesses:
MURRAY OVERAKER,
A. P. BREWER.